US 11,465,580 B2

(12) United States Patent
Silverwood et al.

(10) Patent No.: US 11,465,580 B2
(45) Date of Patent: Oct. 11, 2022

(54) BI-DIRECTIONAL AIRBAG CUSHION WRAPPERS AND RELATED AIRBAG ASSEMBLIES AND METHODS

(71) Applicant: Autoliv ASP, Inc., Ogden, UT (US)

(72) Inventors: Devin Steve Silverwood, Clinton, UT (US); Naoki Morita, Farmington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 86 days.

(21) Appl. No.: 16/843,591

(22) Filed: Apr. 8, 2020

(65) Prior Publication Data

US 2021/0316693 A1 Oct. 14, 2021

(51) Int. Cl.
*B60R 21/231* (2011.01)
*B60R 21/017* (2006.01)
*B60R 21/215* (2011.01)

(52) U.S. Cl.
CPC ...... *B60R 21/23138* (2013.01); *B60R 21/017* (2013.01); *B60R 21/215* (2013.01)

(58) Field of Classification Search
CPC ...... B60R 21/2176; B60R 2021/23146; B60R 21/017; B60R 21/23138; B60R 21/201; B60R 21/215
See application file for complete search history.

(56) References Cited

U.S. PATENT DOCUMENTS

| | | | | |
|---|---|---|---|---|
| 5,195,775 A | * | 3/1993 | Komerska | B60R 21/201 280/728.2 |
| 5,364,126 A | * | 11/1994 | Kuretake | B60R 21/237 102/531 |
| 5,452,913 A | * | 9/1995 | Hansen | B60R 21/201 280/728.1 |
| 5,727,812 A | * | 3/1998 | Dykstra | B60R 21/201 200/61.54 |
| 5,730,463 A | * | 3/1998 | Fisher | B60R 21/207 280/728.1 |
| 5,755,459 A | * | 5/1998 | LaLonde | B60R 21/201 280/728.3 |
| 5,765,863 A | * | 6/1998 | Storey | B60R 21/207 280/729 |
| 5,765,867 A | * | 6/1998 | French | B60R 21/16 280/743.1 |
| 5,884,939 A | * | 3/1999 | Yamaji | B60R 21/2171 280/743.1 |
| 5,997,037 A | * | 12/1999 | Hill | B60R 21/201 280/728.1 |

(Continued)

*Primary Examiner* — Drew J Brown
*Assistant Examiner* — Timothy Wilhelm
(74) *Attorney, Agent, or Firm* — Matthew D. Thayne; Thayne and Davis LLC

(57) ABSTRACT

Airbag cushion wrapper and related airbag assemblies, along with related assembly/manufacturing methods. In some embodiments, the airbag cushion assembly may comprise an airbag cushion and an inflator comprising an inflator wire. A wrapper may extend about the airbag cushion, which wrapper may comprise a first section wrapped about the airbag cushion in a first direction and a second section coupled with the first section, the second section being wrapped about the airbag cushion in a second direction opposite the first direction and such that the first section extends at least partially within the second section.

19 Claims, 6 Drawing Sheets

(56) References Cited

U.S. PATENT DOCUMENTS

| | | | | |
|---|---|---|---|---|
| 6,131,944 A | * | 10/2000 | Henkel | B60R 21/16 280/728.3 |
| 6,145,879 A | * | 11/2000 | Lowe | B60R 21/20 280/743.1 |
| 6,196,577 B1 | * | 3/2001 | Aoki | B60R 21/207 280/730.1 |
| 6,371,510 B1 | * | 4/2002 | Marriott | B60R 21/201 280/730.1 |
| 6,457,741 B2 | * | 10/2002 | Seki | B60R 21/207 280/730.2 |
| 6,460,885 B1 | * | 10/2002 | Bowser | B60R 21/231 280/743.1 |
| 6,588,793 B2 | * | 7/2003 | Rose | B60R 21/2171 280/728.2 |
| 6,612,610 B1 | * | 9/2003 | Aoki | B60R 21/201 280/730.2 |
| 6,669,229 B2 | * | 12/2003 | Thomas | B60R 21/205 280/732 |
| 6,767,030 B2 | * | 7/2004 | Yamaji | B60R 21/205 280/732 |
| 6,832,779 B2 | * | 12/2004 | Tajima | B60R 21/231 280/740 |
| 6,889,999 B2 | * | 5/2005 | Dominissini | B60R 21/201 280/730.2 |
| 6,921,121 B2 | * | 7/2005 | Schneider | B60J 3/0204 280/730.1 |
| 6,942,242 B2 | * | 9/2005 | Hawthorn | B60R 21/16 280/728.2 |
| 6,948,736 B2 | * | 9/2005 | DePottey | B60J 3/0213 280/728.2 |
| 6,955,377 B2 | * | 10/2005 | Cooper | B60R 21/2338 280/743.1 |
| 6,976,705 B2 | * | 12/2005 | Klaiber | B60R 21/237 280/730.2 |
| 7,000,945 B2 | * | 2/2006 | Bakhsh | B60R 21/213 280/728.2 |
| 7,004,501 B2 | * | 2/2006 | Schneider | B60R 21/237 280/743.1 |
| 7,125,037 B2 | * | 10/2006 | Tallerico | B60R 21/231 280/728.2 |
| 7,144,035 B2 | * | 12/2006 | Min | B60R 21/21658 280/731 |
| 7,150,470 B2 | * | 12/2006 | Okada | B60R 21/205 280/743.1 |
| 7,234,728 B2 | * | 6/2007 | Noguchi | B60R 21/232 280/730.2 |
| 7,314,228 B2 | * | 1/2008 | Ishiguro | B60R 21/201 280/728.1 |
| 7,370,880 B2 | * | 5/2008 | Hasebe | B60R 21/201 280/729 |
| 7,401,805 B2 | * | 7/2008 | Coon | B60R 21/201 280/730.2 |
| 7,404,570 B2 | * | 7/2008 | Miyata | B62J 27/20 280/728.2 |
| 7,404,571 B2 | * | 7/2008 | Stevens | B60R 21/2171 280/728.2 |
| 7,441,796 B2 | * | 10/2008 | Noguchi | B60R 21/232 280/730.2 |
| 7,445,238 B2 | * | 11/2008 | Marriott | B60R 21/217 280/729 |
| 7,445,239 B2 | * | 11/2008 | Okada | B60R 21/237 280/743.1 |
| 7,568,730 B2 | * | 8/2009 | Kwon | B60R 21/201 280/728.2 |
| 7,631,894 B2 | * | 12/2009 | Hasebe | B60R 21/201 280/743.2 |
| 7,648,157 B2 | * | 1/2010 | Miwa | B60R 21/203 280/728.2 |
| 7,648,159 B2 | * | 1/2010 | Miyata | B60R 21/23 280/730.1 |
| 7,695,013 B2 | * | 4/2010 | Kakstis | B60R 21/201 280/743.1 |
| 7,712,769 B2 | * | 5/2010 | Hasebe | B60R 21/231 280/729 |
| 7,712,781 B2 | * | 5/2010 | Klinkenberger | B60R 21/231 280/743.1 |
| 7,748,739 B2 | * | 7/2010 | Brinker | B60R 21/231 280/742 |
| 7,753,407 B2 | * | 7/2010 | Yokota | B60R 21/20 280/743.2 |
| 7,845,672 B2 | * | 12/2010 | Onohara | B60R 21/20 280/728.3 |
| 7,874,580 B2 | * | 1/2011 | Wigger | B60R 21/201 280/732 |
| 7,878,539 B2 | * | 2/2011 | Maripudi | B60R 21/23 280/740 |
| 7,900,958 B2 | * | 3/2011 | Yamauchi | B60R 21/231 280/732 |
| 7,946,620 B2 | * | 5/2011 | Vigeant | B60R 21/201 280/743.1 |
| 7,971,900 B2 | * | 7/2011 | Lim | B60R 21/23138 280/730.2 |
| 8,231,140 B2 | * | 7/2012 | Maripudi | B60R 21/2338 280/740 |
| 8,272,664 B2 | * | 9/2012 | Benny | B60R 21/239 280/728.1 |
| 8,276,936 B2 | * | 10/2012 | Shimizu | B60R 21/216 280/728.3 |
| 8,297,650 B2 | * | 10/2012 | Enders | B60R 21/206 280/730.1 |
| 8,297,654 B2 | * | 10/2012 | Lee | B60R 21/237 280/743.1 |
| 8,348,302 B2 | * | 1/2013 | Kim | B60R 21/2176 280/728.2 |
| 8,360,464 B2 | * | 1/2013 | Enders | B60R 21/206 280/730.1 |
| 8,407,968 B2 | * | 4/2013 | Lachat | B60R 21/201 53/429 |
| 8,419,048 B2 | * | 4/2013 | Yamaji | B60R 21/201 280/728.3 |
| 8,491,002 B2 | * | 7/2013 | Schneider | B60R 21/215 280/728.3 |
| 8,500,155 B2 | * | 8/2013 | Enders | B60R 21/205 280/728.2 |
| 8,540,276 B2 | * | 9/2013 | Schneider | B60R 21/237 280/730.1 |
| 8,641,088 B2 | * | 2/2014 | Wiik | B60R 21/213 280/730.2 |
| 8,651,524 B2 | * | 2/2014 | Hardin | B60R 21/201 280/743.1 |
| 8,684,401 B2 | * | 4/2014 | Shibayama | B60R 21/2334 280/730.2 |
| 8,746,738 B2 | * | 6/2014 | Matsui | B60R 21/237 280/743.1 |
| 8,777,262 B2 | * | 7/2014 | Enders | B60R 21/2334 280/743.2 |
| 8,840,141 B1 | * | 9/2014 | Fischer | B60R 21/2346 280/743.2 |
| 9,108,589 B2 | * | 8/2015 | Rickenbach | B60R 21/207 |
| 9,387,822 B2 | * | 7/2016 | Iida | B60R 21/2346 |
| 9,440,609 B2 | * | 9/2016 | Osterfeld | B60R 21/201 |
| 9,539,974 B2 | * | 1/2017 | Fukuda | B60R 21/201 |
| 9,573,551 B1 | * | 2/2017 | Wang | B60R 21/23138 |
| 9,580,036 B2 | * | 2/2017 | Choi | B60R 21/213 |
| 9,682,678 B2 | * | 6/2017 | Rose | B60R 21/201 |
| 9,849,858 B2 | * | 12/2017 | Inazumi | B60R 21/2338 |
| 9,925,943 B2 | * | 3/2018 | Ohno | B60R 21/207 |
| 9,925,946 B2 | * | 3/2018 | Webber | B60R 21/201 |
| 9,981,625 B2 | * | 5/2018 | Witt, Jr. | B60R 21/213 |
| 10,053,042 B2 | * | 8/2018 | Garcia Eireos | B60R 21/201 |
| 10,279,767 B2 | * | 5/2019 | Motomochi | B60R 21/201 |
| 10,328,886 B2 | * | 6/2019 | Peyre | B60R 21/261 |
| 10,384,633 B2 | * | 8/2019 | Warm | B60R 21/2165 |
| 10,384,634 B2 | * | 8/2019 | Wiscombe | B60R 21/2176 |
| 10,384,636 B2 | * | 8/2019 | Shimizu | D04H 3/011 |
| 10,471,921 B2 | * | 11/2019 | Ydren | B60R 21/2176 |
| 10,486,633 B2 | * | 11/2019 | Kino | B60R 21/2165 |
| 10,596,990 B2 | * | 3/2020 | Sato | B60R 21/201 |
| 10,696,266 B2 | * | 6/2020 | Enders | B60R 21/206 |

(56) References Cited

U.S. PATENT DOCUMENTS

| | | | |
|---|---|---|---|
| 10,864,883 B2* | 12/2020 | Yanagisawa | B60R 21/201 |
| 10,953,841 B2* | 3/2021 | Tamai | B60R 21/215 |
| 10,994,687 B2* | 5/2021 | Hess | B60R 21/231 |
| 2002/0084635 A1* | 7/2002 | Tajima | B60R 21/239 280/732 |
| 2002/0096864 A1* | 7/2002 | Asano | B60R 21/232 280/730.2 |
| 2005/0046156 A1* | 3/2005 | Yoshikawa | B60R 21/2171 280/728.2 |
| 2005/0070414 A1* | 3/2005 | Schneider | B60R 21/237 493/405 |
| 2006/0255572 A1* | 11/2006 | Svenbrandt | B60R 21/233 280/730.2 |
| 2007/0138779 A1* | 6/2007 | Kwon | B60R 21/205 280/743.2 |
| 2007/0164541 A1* | 7/2007 | Soderquist | B60R 21/201 280/728.2 |
| 2007/0284858 A1* | 12/2007 | Nishimura | B60R 21/217 280/729 |
| 2008/0217887 A1* | 9/2008 | Seymour | B60R 21/2338 280/728.2 |
| 2008/0217892 A1* | 9/2008 | Maripudi | B60R 21/201 280/740 |
| 2009/0102166 A1* | 4/2009 | Brown | B60R 21/201 280/728.2 |
| 2009/0152842 A1* | 6/2009 | Benny | B60R 21/2338 280/728.3 |
| 2010/0066059 A1* | 3/2010 | Klinkenberger | B60R 21/231 280/728.1 |
| 2011/0088356 A1* | 4/2011 | Lachat | B60R 21/201 53/429 |
| 2017/0043738 A1* | 2/2017 | Peyre | B60R 21/214 |
| 2019/0256033 A1* | 8/2019 | Schmid | B60R 21/237 |
| 2020/0180541 A1* | 6/2020 | Abelenda Alcalde | B60R 21/201 |
| 2020/0254955 A1* | 8/2020 | Navarro Arranz | B60R 21/237 |
| 2020/0254959 A1* | 8/2020 | Navarro Arranz | B60R 21/214 |
| 2020/0276954 A1* | 9/2020 | Navarro Arranz | B60R 21/214 |
| 2021/0107428 A1* | 4/2021 | Toba | B60R 21/23138 |

* cited by examiner

BI-DIRECTIONAL AIRBAG CUSHION WRAPPERS AND RELATED AIRBAG ASSEMBLIES AND METHODS

SUMMARY

In certain airbag cushion assemblies, such as, for example, side impact airbag cushions, one or more wires are often present that may introduce difficulties during assembly/manufacturing. For example, the wire(s), or the airbag cushion itself, may be pinched during assembly, such as pinched to the frame of an adjacent vehicle seat, which may lead to deployment failures, undesired deployment characteristics, or damage to the cushion and/or inflator/initiator wires. Single layer wrappers have been used previously, however no wrappers have been used to solve both cushion pinching and wire pinching, nor have any known wrappers provided both inboard and outboard wrapping.

The present inventors have determined that it would be desirable to provide apparatus, systems, and methods that overcome one or more of the foregoing limitations and/or other limitations of the prior art. In some embodiments, the inventive concepts disclosed herein may therefore provide a wrapper, preferably made up of a single, unitary piece of material, that provides a bi-directional and preferably dual layer wrapping about an airbag cushion to provide protection to the cushion and the wire(s). In some preferred embodiments and implementations, the wrapper may comprise two sections or portions coupled together at one end and loose at the opposite end. The first section/portion may then be wrapped around a portion of the airbag cushion and coupled to itself and/or another region of the cushion or assembly at or adjacent to the closed end. The second section/portion may then be wrapped around the airbag cushion, preferably in the opposite direction and may then again be recoupled with itself. In preferred embodiments and implementations, this may result in both opposing ends of both sections/portions being coupled together, resulting in a region with four layers at this coupling region. In between the two wrapped layers, the wire(s) may be inserted to provide protection thereto.

In a more particular example of an airbag cushion assembly according to some embodiments, the assembly may comprise an airbag cushion, such as a side impact airbag cushion, and an inflator or initiator comprising an inflator wire extending therefrom. A wrapper may extend about the airbag cushion and may comprise a first section wrapped about the airbag cushion in a first direction and a second section coupled with the first section. The second section may be wrapped about the airbag cushion in a second direction opposite the first direction and/or the first section may extend at least partially within the second section.

In some embodiments, the wrapper may be coupled to at least a portion of the inflator or another part of an inflator assembly including the inflator. For example, in some embodiments, at least a portion of the inflator or an initiator coupled with the inflator may extend through an opening formed in the wrapper. One or more studs of the inflator assembly may also, or alternatively, extend through various openings formed in the wrapper.

In some embodiments, the inflator wire may be at least partially positioned in between the first section and the second section.

In some embodiments, opposing ends of the first section of the wrapper may be coupled together and/or opposing ends of the second section of the wrapper may be coupled together. This may be done, for example, using stitching and/or extending a stud or other projecting member of the airbag assembly through various openings formed in both sections of the wrapper In some embodiments, the airbag cushion may be in a compressed configuration defining an elongated axis. In some such embodiments, the wrapper may extend about the airbag cushion in a direction perpendicular, or at least substantially perpendicular, to the elongated axis.

In another particular example of an airbag cushion assembly according to other embodiments, the assembly may comprise an airbag cushion in a compressed configuration. The compressed airbag cushion may define an elongated axis. The assembly may further comprise an inflator comprising an inflator wire. A first wrapper portion of a wrapper, which may comprise an integral piece of material or multiple pieces coupled together, may be wrapped about the airbag cushion. In some embodiments, the first wrapper portion may be wrapped about the airbag cushion in a direction at least substantially perpendicular to the elongated axis. A second wrapper portion may be coupled to the first wrapper portion and may be wrapped about the airbag cushion. Again, in some embodiments, the second wrapper portion may be wrapped in a direction at least substantially perpendicular to the elongated axis. In preferred embodiments, the second wrapper portion may be wrapped in an opposite, or at least substantially opposite, direction vis-à-vis the first wrapper portion.

The first wrapper portion may be at least partially layered or overlap with respect to the second wrapper portion about the airbag cushion. The inflator wire may then at least partially extend between the first wrapper portion and the second wrapper portion along at least a portion of the layered region.

In some embodiments, the first wrapper portion may form a first loop about the airbag cushion. In some such embodiments, the second wrapper portion may form a second loop about the airbag cushion, which second loop may at least partially overlap with the first loop.

In some embodiments, at least one of the first wrapper portion and the second wrapper portion may comprise a window, such as a rectangular window. In such embodiments, preferably at least a portion of the inflator wire is visible through the window to allow for visual (either human or automated) inspection of the wire being in its proper position.

In some embodiments, the second wrapper portion may have a width greater than a width of the first wrapper portion. The widths of the first and second wrapper portions may be defined in a direction perpendicular to the directions to which the first wrapper portion and the second wrapper portion extend about the airbag cushion and/or a direction perpendicular to an elongated axis/direction (the "length") of the wrapper/wrapper portion.

In some embodiments, each of a first end of the first wrapper portion, a second end of the first wrapper portion, a first end of the second wrapper portion, and a second end of the second wrapper portion may be coupled together at a common coupling region. Such coupling may be accomplished by one or more of, for example, sewing, insertion of studs or other projecting members through openings formed in the various wrapper portions, and/or insertion of an inflator and/or initiator through another opening formed in one or both of the wrapper portions.

In an example of a method for assembly of an airbag cushion assembly according to some implementations, the method may comprise coupling a wrapper to at least a portion of an airbag cushion assembly comprising an airbag cushion adjacent to a first end of the wrapper. A first portion of the wrapper may be wrapped or otherwise extended about the airbag cushion in a first direction to define a first wrapper layer and a second portion of the wrapper may be wrapped or otherwise extended about the airbag cushion in a second direction. In some implementations, the second direction may be at least substantially opposite the first direction and/or may define a second wrapper layer such that the two wrapper layers at least partially overlap.

In some implementations, an inflator wire may be positioned at least partially in between the first layer and the second layer.

In some implementations, the step of coupling a wrapper to at least a portion of the airbag cushion assembly may comprise extending an inflator stud through a first opening formed adjacent to the first end of the wrapper. In some such implementations, the step of coupling a wrapper to at least a portion of the airbag cushion assembly may further comprise extending at least a portion of the inflator through a second opening formed adjacent to the first end of the wrapper. In some implementations, the second opening may be larger than the first opening.

Some implementations may further comprise coupling a second end of the wrapper opposite the first end to at least a portion of the airbag cushion assembly.

In some implementations, the airbag cushion may be folded or otherwise compressed into a configuration defining an elongated axis. In some such implementations, the step of extending a first portion of the wrapper about the airbag cushion in a first direction to define a first wrapper layer may comprise extending the first portion about the airbag cushion in a direction at least substantially perpendicular to the elongated axis.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
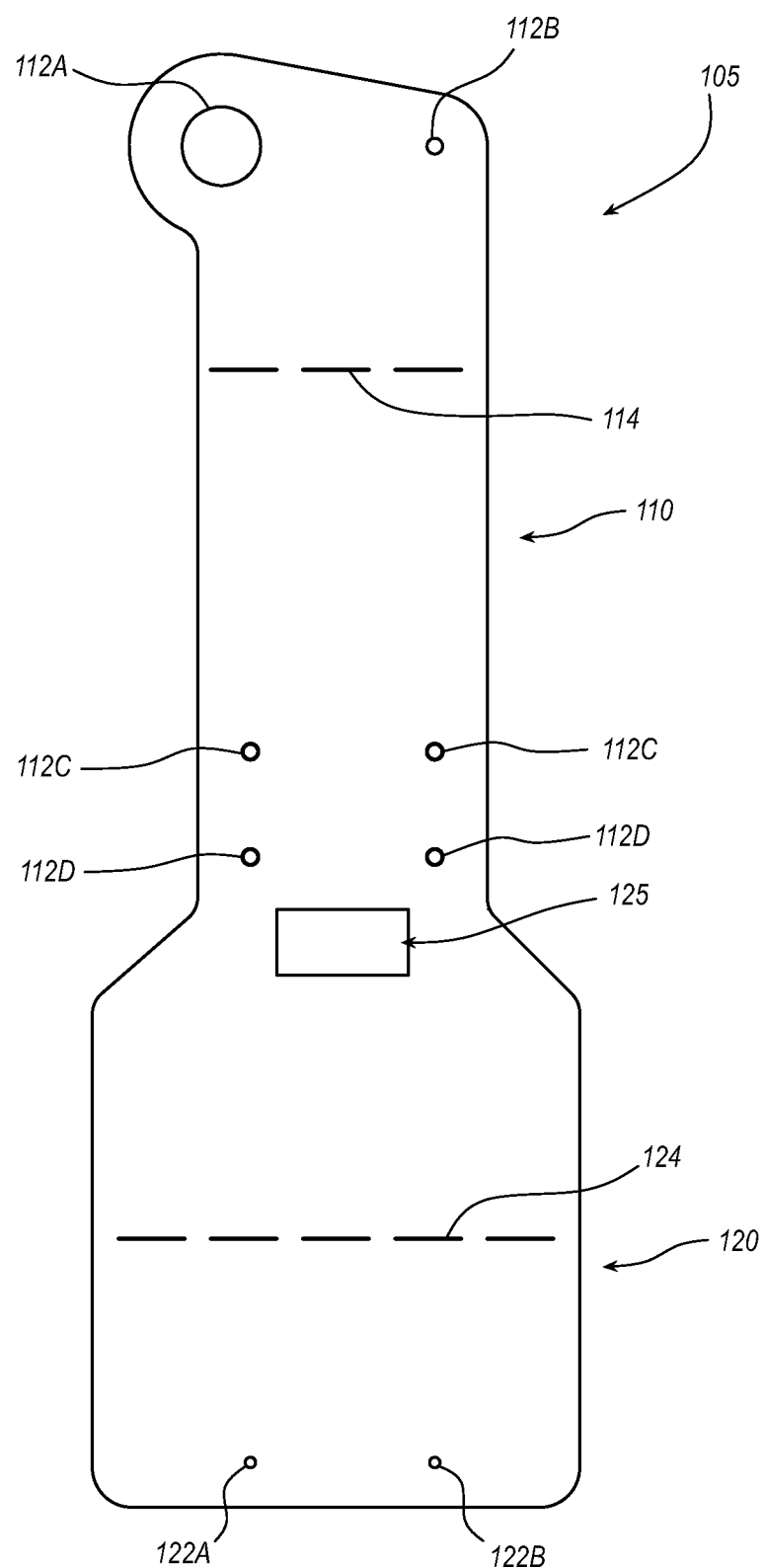
FIG. 1 is a plan view of a wrapping member for an airbag cushion assembly according to some embodiments.

FIG. 1 depicts an airbag cushion wrapper 105 or wrapping member according to some embodiments, which wrapper 105 may be used to provide a double-sided and/or bi-directional wrapping of an airbag cushion (not shown in FIG. 1). As shown in FIG. 1, wrapper 105 comprises a first section or portion 110 and a second section or portion 120, which, as discussed below, may be folded together and/or form separate wrapping lengths for providing a dual layer and/or bi-directional wrapper for an airbag cushion assembly.

Section 110 comprises a series of openings 112, which are depicted as circular but may define other shapes in alternative embodiments. More particularly, at the top of FIG. 1, a first opening 112A is provided along a protruding portion of the wrapper 105, and a second opening 112B is provided opposite first opening 112A. As can be seen in FIG. 1, opening 112A is considerably larger than opening 112B, the reasons for which will be apparent upon review of the additional details provided below.

One or more alignment features may be provided to facilitate folding of wrapper 105 in a preferred manner. For example, the depicted embodiment comprises a first line or other alignment marker 114 formed along portion 110 and a second line or other alignment marker 124 formed along portion 120. Wrapper 105 may be folded in a manner such that markers 114 and 124 are aligned, as shown in FIG. 2.

Additional openings 112 may be formed, such as opposing openings 112C and 112D. Similar openings 122A and 122B may be formed adjacent an edge of portion 120. As discussed below, openings 122A and 122B may be configured to be aligned, or at least partially overlap, with openings 112A and 112B, respectively, following folding of portion 110 with respect to portion 120. In some embodiments, most or all of these openings may be configured to receive a single feature, such as a stud from an inflator assembly, and may therefore have the same or at least substantially the same size.

A central opening or window 125 may also be provided. In the depicted embodiment, this opening/window 125 is formed on portion 120 adjacent to portion 110.

Figure 2:
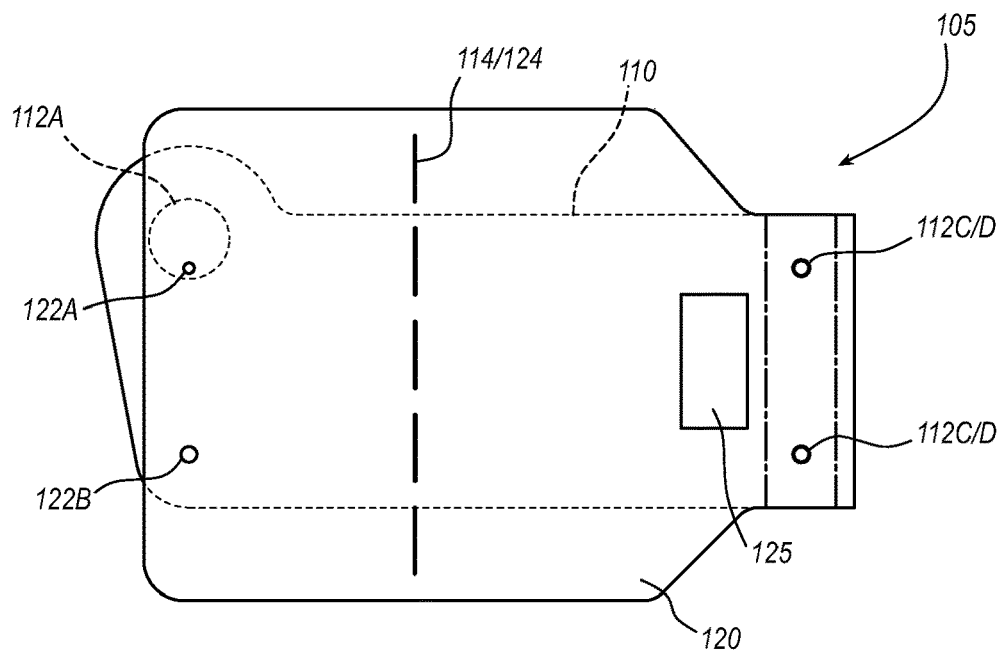
FIG. 2 depicts the wrapping member of FIG. 1 being folded during a stage of assembly of a method for wrapping an airbag cushion.

As shown in FIG. 2, wrapper 105 may be folded such that portions 110 and 120 at least partially overlap with one another. Thus, in the depicted embodiment, markers 114 and 124 are aligned, openings 112C and 112D are aligned, and openings 112A/122A and 1126/122B are aligned to at least partially overlap.

In some embodiments and implementations, a portion of the folded wrapper 105 may also be sewn or otherwise fixedly coupled together. Thus, in the depicted embodiment, the portion at the right side of FIG. 2 may be sewn together using one or more stitches, sew lines, and/or the like, to form a closed end. In the depicted embodiment, two such sew lines are shown running adjacent to window 125 with one line on either side of aligned openings 112C/D. Preferably, the end of the folded wrapper 105 opposite from the closed/coupled end is open. In other words, the opposing ends of portions 110 and 120 in FIG. 1, which are folded to be adjacent to one another in the stage depicted in FIG. 2, are not fixedly coupled with one another at this stage.

Figure 3:
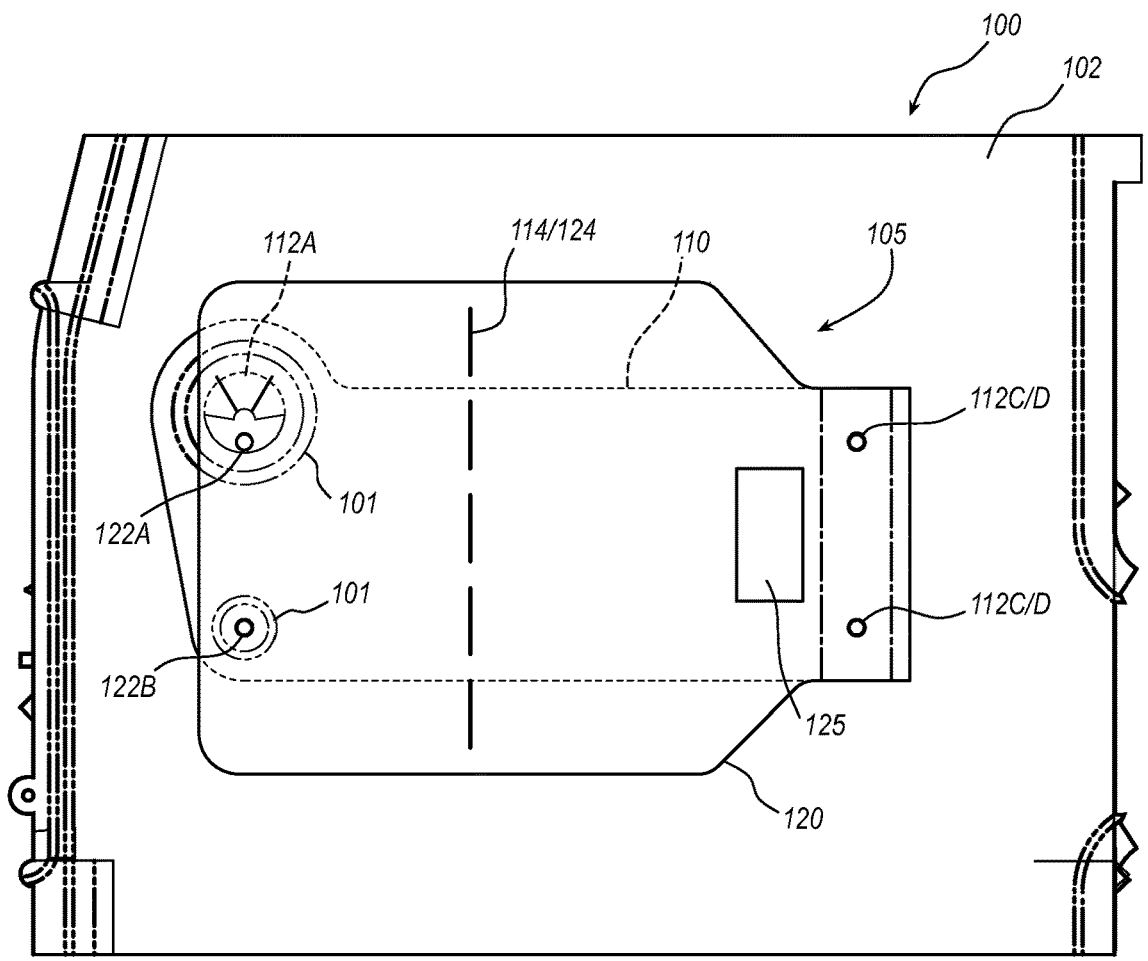
FIG. 3 depicts the wrapping member being coupled with an airbag cushion.

FIG. 3 depicts a portion of an airbag cushion assembly 100 including an airbag cushion 102 following coupling of the folded cushion wrapper 105 to airbag cushion 102. In the depicted embodiment, various sew lines 101 are formed about openings 112A and 122A. However, it is contemplated that, in alternative embodiments, sew lines or other means for coupling may be applied in other regions of the wrapper 105 as desired.

Figure 4:
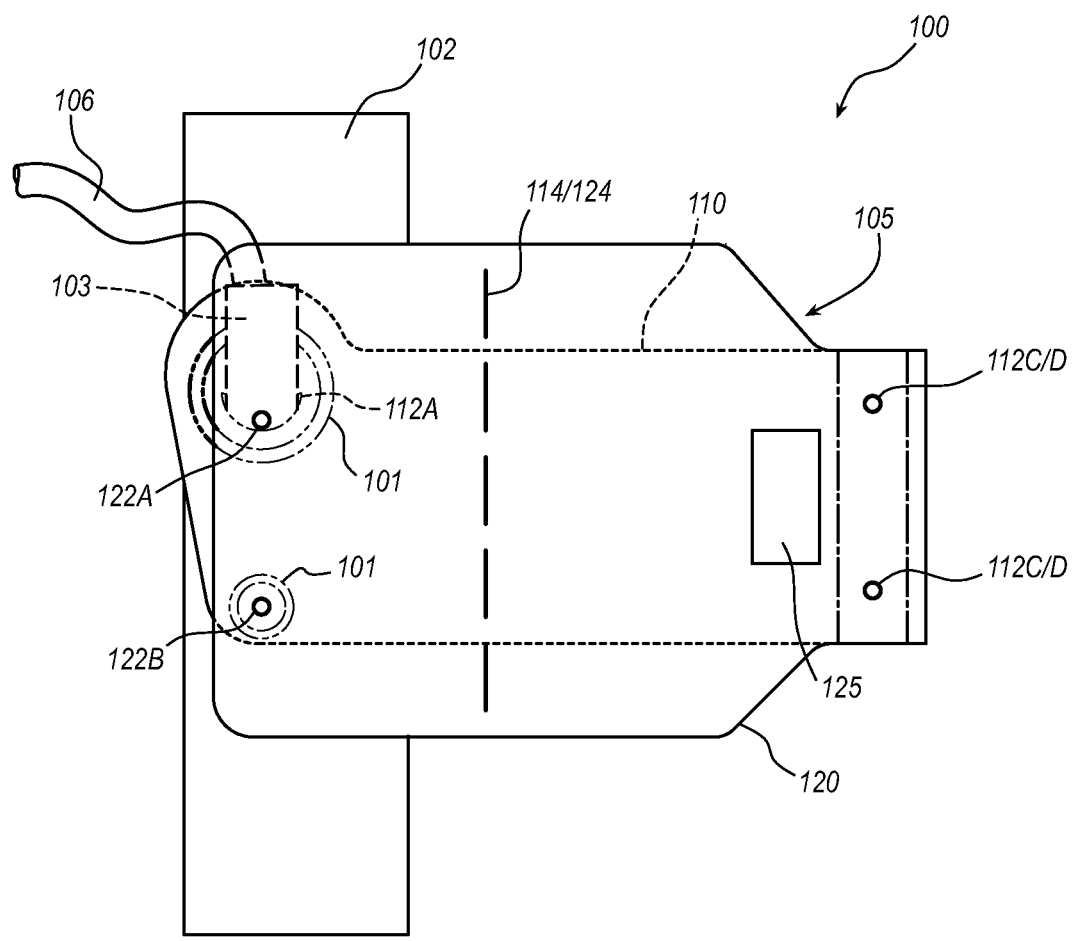
FIG. 4 depicts a portion of an inflator of an airbag cushion assembly being inserted through an opening in the wrapping member.

As shown in FIG. 4, a portion of the inflator 103 or inflator assembly, such as an initiator coupled with the inflator may be inserted through the larger opening 112A of wrapper 105. Inflator 103 may also have an inflator wire 106 extending therefrom. The cushion 102 is also shown in FIG. 4 in an elongated, folded or otherwise compressed configuration, which, as those of ordinary skill in the art will appreciate, may be done at a stage of the process not shown in the figures or, need not be done at all in other configurations.

Figure 5:
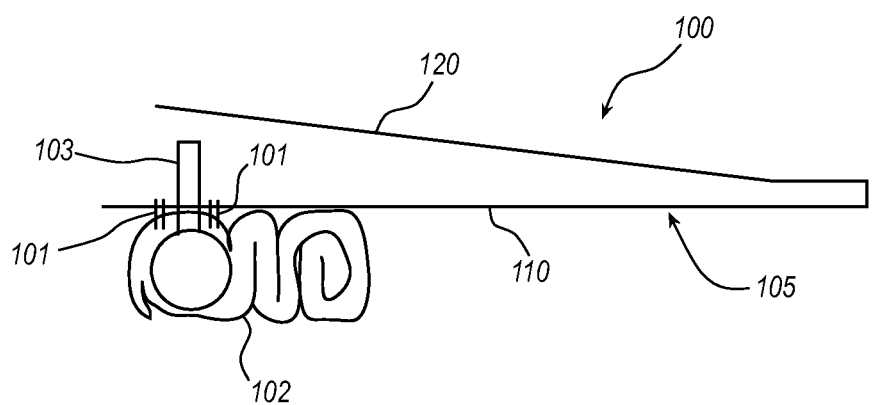
FIG. 5 is a cross-sectional view of the assembly in the stage depicted in FIG. 4

As better seen in the cross-sectional view of FIG. 5, at this stage of the assembly process, portion 110 of wrapper 105 extends over a first side of the compressed airbag cushion 102. Portion 120 is essentially "loose" at this stage of the assembly process.

Figure 6:
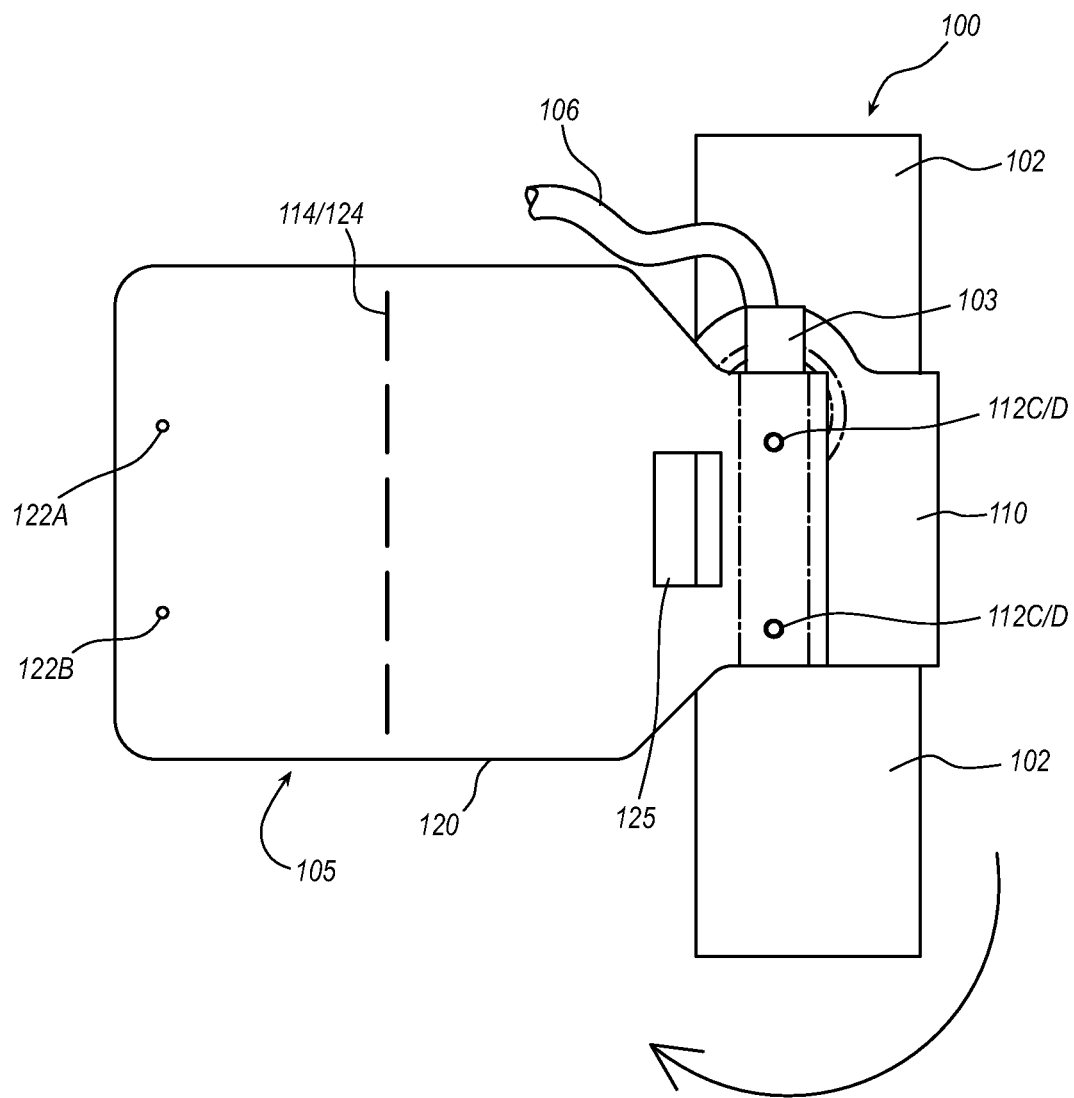
FIG. 6 depicts the airbag cushion assembly following a first wrapping step of an assembly process.

FIG. 6 depicts airbag cushion assembly 100 following a wrapping step in which wrapper 105 has been wrapped about a periphery of airbag cushion 102 in a direction at least substantially perpendicular to an elongated axis of the compressed airbag cushion 102. As better shown in the cross-sectional view of FIG. 7, portion 110 has been fully wrapped about a portion of cushion 102 to define a loop and then has been recoupled to itself and/or a portion of assembly 100.

In some implementations of inventive methods involving, for example, side impact cushions, one wrapping step may be performed to extend the wrapper 105 about, or at least substantially about, the outboard side of the assembly 100 and another step may be performed to extend the wrapper 105 about the inboard side of the assembly 100. In the depicted embodiment, the first step is shown having been performed to result in the configuration shown in FIG. 6 and the outboard side is represented on the right side of FIG. 6 and its related figures having the same view and the outboard side is represented on the left side.

Figure 7:
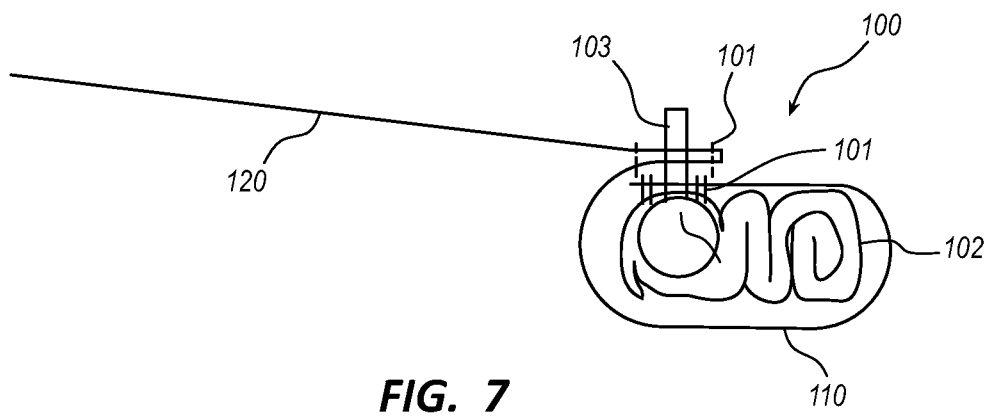
FIG. 7 is a cross-sectional view of the assembly in the stage depicted in FIG. 6.

In the depicted embodiment, this recoupling step may be accomplished by extending a stud or other feature of assembly 100 through one or both of the aligned openings 112C/112D. In some embodiments, additional stitching 101 may be used to fixedly couple portion 110 to itself, preferably adjacent or near opposite ends of portion 110, as indicated in FIG. 7.

Figure 8:
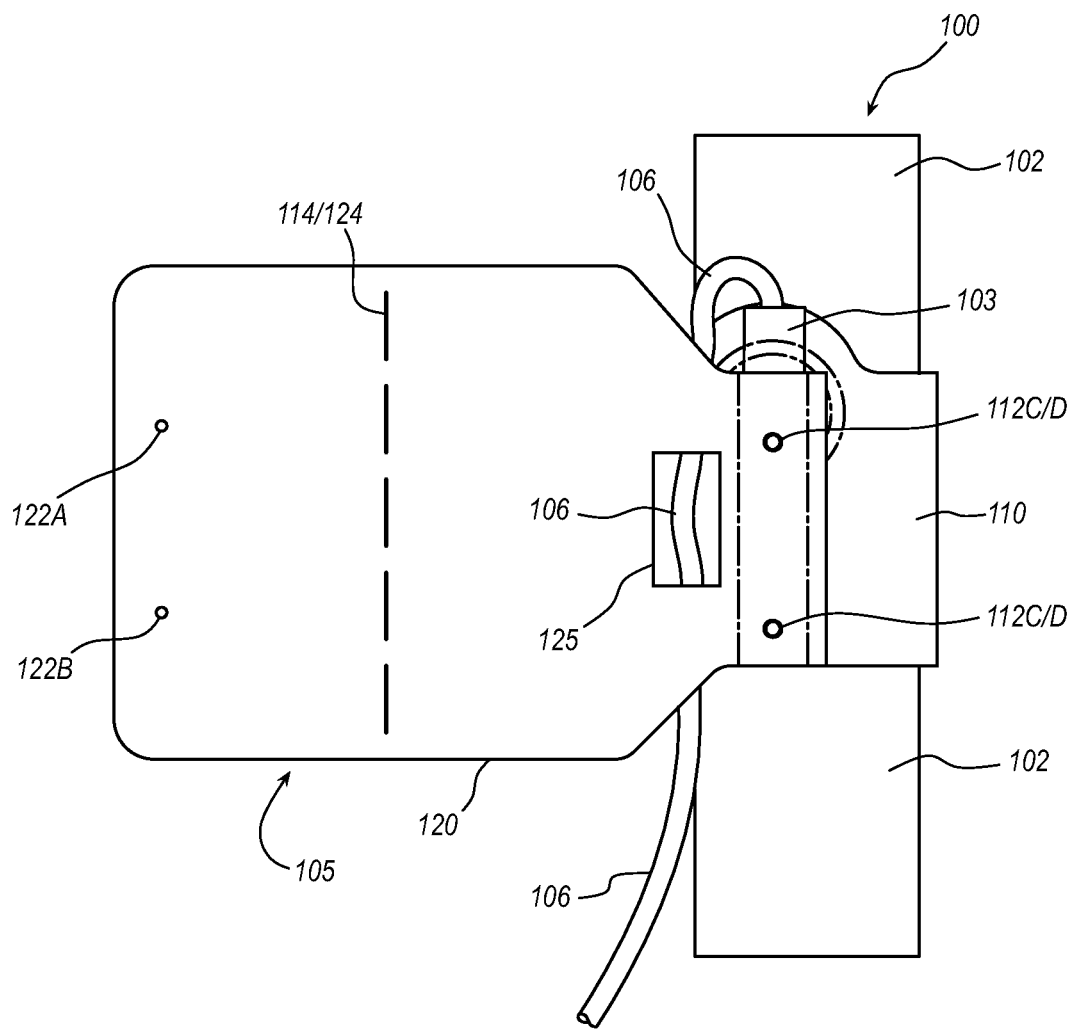
FIG. 8 depicts the airbag cushion assembly after an inflator wire has been routed through the wrapping member.
Figure 9:
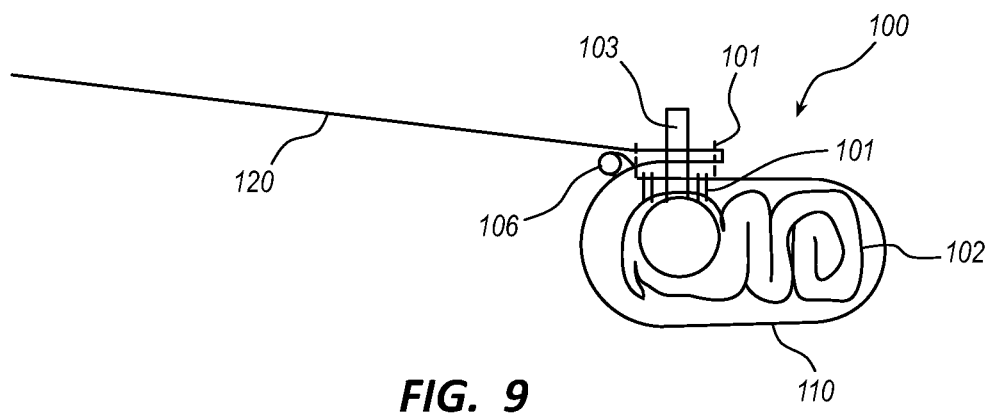
FIG. 9 is a cross-sectional view of the assembly in the stage depicted in FIG. 8.

Wire 106 of inflator 103 may then be routed in between portions 110 and 120, as shown in FIGS. 8 and 9. In embodiments comprising window 125, this step is preferably done such that wire 106 is exposed/visible. In this manner, proper positioning of the wire 106 and/or inflator 103 may be visualized, either by a human inspector or, for example, by a camera configured to identify a particular color of the wire 106.

Additional stitches or other coupling means may be used as well. Thus, FIG. 9 depict additional stitching being used to couple the distal end of portion 110 to the proximal end and/or the proximal/fixed end of portion 120. This may be done in addition to, or as an alternative to, coupling the distal end of portion 110 by insertion of studs, such as studs coupled to inflator 103 and/or an associated initiator, through openings 112A and/or 112B. By providing this additional coupling means, wire 106 may be inhibited from shifting towards the adjacent stud or other inflator component.

Figure 10:
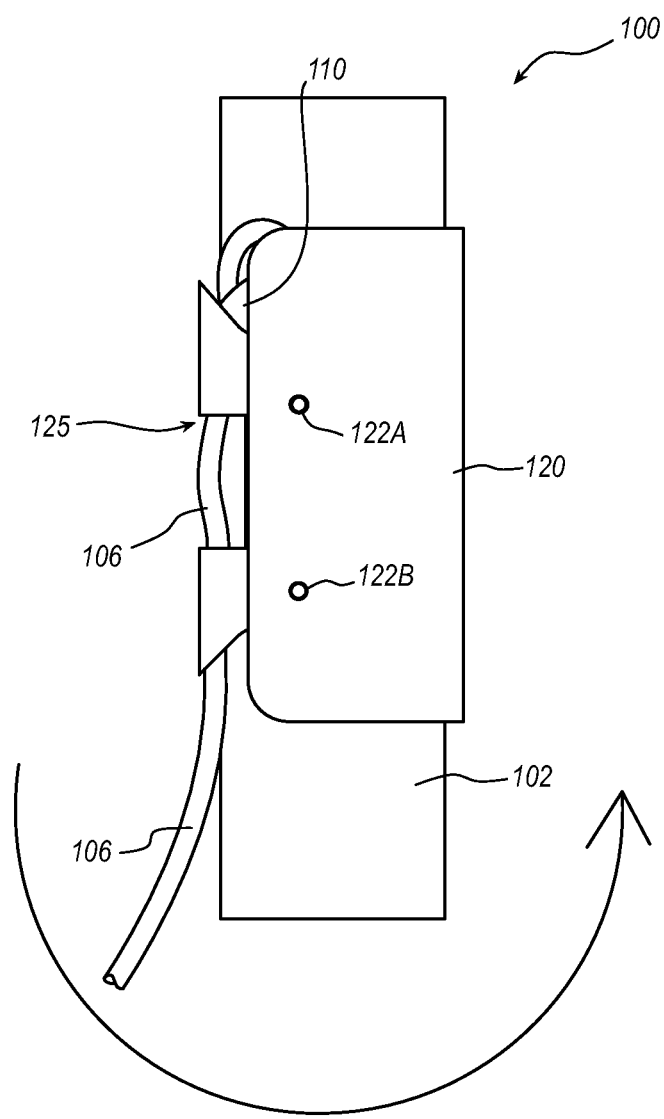
FIG. 10 depicts the airbag cushion assembly following a second wrapping step of an assembly process.
Figure 11:
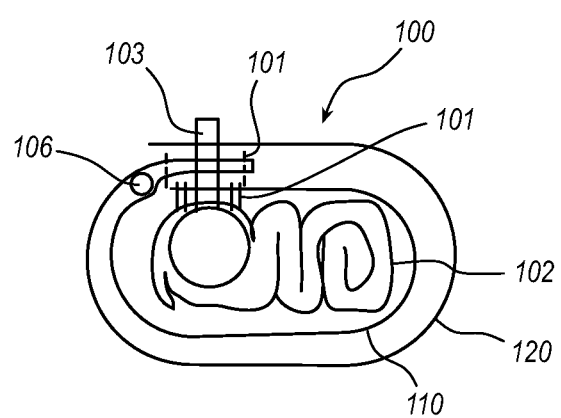
FIG. 11 is a cross-sectional view of the assembly in the stage depicted in FIG. 10.

Once the wire 106 has been routed/positioned as desired, wrapper 105 may be wrapped again, preferably in the opposite direction, such that wire 106 extends between portions 110 and 120, as shown in FIGS. 10 and 11. To provide additional detail, following the stage depicted in FIGS. 8 and 9, portion 120 may be extended about the previously-wrapped portion 110 in the opposite direction with which portion 110 was wrapped to create two loops and/or layers of wrapping about cushion 102, as best shown in FIG. 11.

To maintain assembly 101 in this bi-directionally, dual-wrapped configuration, the end of portion 120 may be coupled, either fixedly or releasably, to a portion of the wrapper 105 and/or another portion of the assembly 100.

Thus, in the depicted embodiment, a stud or other feature of inflator 103 or another part of assembly 100 may be extended through one or both of openings 122A and 122B, as shown in FIG. 10. Thus, in the depicted embodiment, both opposing ends of portion 110 and both opposing ends of portion 120 are coupled together at, or at least substantially at, the same region or regions. There are therefore four layers of wrapper 105 in this region. Moreover, in some embodiments, the same stud or studs may extend through openings 112A and/or 122B, openings 112C and/or 112D, and also through openings 122A and/or 122B.

This wrapping configuration, or other similar configurations based upon these disclosure materials, may be used to avoid unwanted pinching of two portions of an airbag cushion assembly, such as an airbag cushion and a wire or other element of an inflator. In connection with certain airbag cushion modules/assemblies, such as side impact cushions or knee airbag cushions, such configurations may also be used to provide both outboard side wrapping and inboard side wrapping, either for protection of two distinct components of the module/assembly or for providing protection to two different portions of a single component of the module/assembly.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag cushion;
   an inflator comprising an inflator wire extending therefrom; and
   a wrapper extending about the airbag cushion, wherein the wrapper comprises:
     a first section wrapped about the airbag cushion in a first direction; and
     a second section coupled with the first section, the second section wrapped about the airbag cushion in a second direction opposite the first direction, wherein the first section extends at least partially within the second section, wherein at least a portion of the inflator wire extends between respective layers defined by the first section and the second section, and wherein the first section and the second section are wrapped about the airbag cushion without slack.

2. The airbag cushion assembly of claim 1, wherein the wrapper is coupled to at least a portion of an inflator assembly comprising the inflator.

3. The airbag cushion assembly of claim 2, wherein at least a portion of the inflator or an initiator coupled with the inflator extends through an opening formed in the wrapper.

4. The airbag cushion assembly of claim 1, wherein opposing ends of the first section of the wrapper are coupled together.

5. The airbag cushion assembly of claim 4, wherein opposing ends of the second section of the wrapper are coupled together.

6. The airbag cushion assembly of claim 1, wherein the airbag cushion assembly comprises a side impact airbag cushion assembly.

7. The airbag cushion assembly of claim 1, wherein the airbag cushion is in a compressed configuration defining an elongated axis, and wherein the wrapper extends about the airbag cushion in a direction at least substantially perpendicular to the elongated axis.

8. An airbag cushion assembly, comprising:
   an airbag cushion in a compressed configuration defining an elongated axis;
   an inflator comprising an inflator wire;
   a first wrapper portion wrapped about a full perimeter of the airbag cushion without slack in a direction at least substantially perpendicular to the elongated axis; and
   a second wrapper portion coupled to the first wrapper portion and wrapped about a full perimeter of the airbag cushion without slack in a direction at least substantially perpendicular to the elongated axis,
     wherein the first wrapper portion is at least partially layered with respect to the second wrapper portion about the airbag cushion, and
     wherein at least a portion of the inflator wire extends between respective layers defined by the first wrapper portion and the second wrapper portion.

9. The airbag cushion assembly of claim 8, wherein the first wrapper portion and the second wrapper portion are integral portions of a single wrapper.

10. The airbag cushion assembly of claim 8, wherein the first wrapper portion forms a first loop about the airbag cushion, and wherein the second wrapper portion forms a second loop about the airbag cushion.

11. The airbag cushion assembly of claim 8, wherein at least one of the first wrapper portion and the second wrapper portion comprises a window, and wherein at least a portion of the inflator wire is visible through the window.

12. The airbag cushion assembly of claim 8, wherein the second wrapper portion has a width greater than a width of the first wrapper portion, the widths of the first and second wrapper portions being defined in a direction perpendicular to the directions to which the first wrapper portion and the second wrapper portion extend about the airbag cushion.

13. The airbag cushion assembly of claim 8, wherein each of a first end of the first wrapper portion, a second end of the first wrapper portion, a first end of the second wrapper portion, and a second end of the second wrapper portion is coupled together at a common coupling region.

14. A method for assembly of an airbag cushion assembly, the method comprising the steps of:
   coupling a wrapper to at least a portion of an airbag cushion assembly comprising an airbag cushion adjacent to a first end of the wrapper;

extending a first portion of the wrapper about the airbag cushion in a first direction to define a first wrapper layer mounted between the first end and a central portion of the wrapper;

extending a second portion of the wrapper about the airbag cushion in a second direction mounted between the central portion and a second end of the wrapper opposite the first end, the second direction being at least substantially opposite the first direction, to define a second wrapper layer; and extending an inflator wire in between the first layer and the second layer.

15. The method of claim 14, wherein the step of coupling a wrapper to at least a portion of the airbag cushion assembly comprises extending an inflator stud through a first opening formed adjacent to the first end of the wrapper.

16. The method of claim 15, wherein the step of coupling a wrapper to at least a portion of the airbag cushion assembly further comprises extending at least a portion of the inflator through a second opening formed adjacent to the first end of the wrapper, wherein the second opening is larger than the first opening.

17. The method of claim 14, further comprising coupling the second end of the wrapper opposite the first end to at least a portion of the airbag cushion assembly.

18. The method of claim 14, further comprising compressing the airbag cushion into a configuration defining an elongated axis.

19. The method of claim 18, wherein the step extending a first portion of the wrapper about the airbag cushion in a first direction to define a first wrapper layer comprises extending the first portion about the airbag cushion in a direction at least substantially perpendicular to the elongated axis.

\* \* \* \* \*